United States Patent
Wang

(10) Patent No.: US 10,251,037 B2
(45) Date of Patent: Apr. 2, 2019

(54) UNIVERSAL SMART DEVICE

(71) Applicant: FOCUS UNIVERSAL INC., Ontario, CA (US)

(72) Inventor: Desheng Wang, Diamond Bar, CA (US)

(73) Assignee: FOCUS UNIVERSAL INC., Ontario, CA (US)

( * ) Notice: Subject to any disclaimer, the term of this patent is extended or adjusted under 35 U.S.C. 154(b) by 0 days.

(21) Appl. No.: 15/925,400

(22) Filed: Mar. 19, 2018

(65) Prior Publication Data

US 2018/0213380 A1    Jul. 26, 2018

Related U.S. Application Data

(63) Continuation of application No. 15/344,041, filed on Nov. 4, 2016, now Pat. No. 9,924,295.

(60) Provisional application No. 62/281,104, filed on Jan. 20, 2016.

(51) Int. Cl.

| | |
|---|---|
| H04W 4/00 | (2018.01) |
| H04W 4/70 | (2018.01) |
| H04M 1/725 | (2006.01) |
| H04L 12/24 | (2006.01) |
| H04L 12/26 | (2006.01) |
| H04B 1/38 | (2015.01) |
| H04W 88/02 | (2009.01) |
| H04L 29/12 | (2006.01) |

(52) U.S. Cl.
CPC .............. *H04W 4/70* (2018.02); *H04L 41/22* (2013.01); *H04L 41/24* (2013.01); *H04L 43/12* (2013.01); *H04M 1/72583* (2013.01); *H04L 61/6068* (2013.01); *H04W 88/02* (2013.01)

(58) Field of Classification Search
CPC ...... H04W 4/005; H04W 4/006; H04W 4/008
USPC .......................... 455/557; 702/116, 121, 122
See application file for complete search history.

(56) References Cited

U.S. PATENT DOCUMENTS

| | | | | |
|---|---|---|---|---|
| 9,924,295 | B2 * | 3/2018 | Wang | H04W 4/70 |
| 2013/0245965 | A1 * | 9/2013 | Kane | G01D 7/00 |
| | | | | 702/33 |
| 2014/0375428 | A1 * | 12/2014 | Park | G06K 7/10237 |
| | | | | 340/10.1 |

* cited by examiner

*Primary Examiner* — Lee Nguyen
(74) *Attorney, Agent, or Firm* — Innovation Capital Law Group, LLP; Vic Lin

(57) ABSTRACT

A computing device, such as a smartphone, can replace the hardware of various instruments to overcome the cost issue in designing universal smart instruments. Distinguished from traditional instruments, a universal smart instrument takes the maximum advantage of the latest smart phone or mobile computing devices. The instrument control panel is realized on the smartphone by applying the interactive graphical representation of control and indicator elements common in real instruments such as knobs, buttons, dials, graphs and the like. Universal smart instruments unify heterogeneous measurement probes on the market into a single device that can be readily modified or expanded when new technologies need to be added to the existing system or current measurement requirement change. Universal smart instruments also make use of the internet to publish and share data, which was unable to be achieved in conventional propriety instruments.

12 Claims, 3 Drawing Sheets

UNIVERSAL SMART DEVICE

BACKGROUND OF THE INVENTION

1. Field of the Invention

One or more embodiments of the invention relates generally to instruments and accessories for measuring data. More particularly, the invention relates to a universal smart wireless device that can utilize a smart phone, mobile devices or computer as a platform that can display and communicate with a group of sensors or probes in a way to provide compatibility with any sensor and can drive any number of sensors.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Instruments are the devices that are specifically designed and constructed for sensing and measuring physical variables that are crucial in industrial operations, environmental, commercial and medical applications, research and development, and our daily lives. They are an integral part of modern science as well as of engineering and commerce. In recent years, significant progress has been made in instruments and instrumentation systems. The performance of measuring and monitoring instruments has improved considerably.

Analog and digital or combinations of the two are the three kinds of measuring instruments. The analog instruments are used to indicate the magnitude of the quantity in the form of pointer movement. The digital instruments specify the quantity in digital formats, and they can be read easily, are more accurate than the analog multi-meters, reducing the interpolation and reading errors. Digital instruments offer significant advantages over analog devices. The auto-polarity function of digital devices prevents various problems. Parallax error, which occurs when the pointer of an analog instrument is viewed from a different angle and users tend to see a different value, are eliminated as well. They are free from the wear and shock failures as a result of a lack of moving parts. With the advancement of technology of integrated circuits, digital instruments are becoming increasingly compact and accurate.

Most of the modern instruments are digital. They are designed for measuring various physical quantities in an object. Such instruments consist of the following functional components: (1) Data acquisition is the process of sampling signals that measure real world physical conditions and converting the resulting samples into digital numeric values that can be manipulated by a microprocessor. The components of data acquisition systems include: sensors, to convert physical parameters to electrical signals; signal conditioning circuitry, to convert sensor signals into a form that can be converted to digital values; analog-to-digital converters, to convert conditioned sensor signals to digital values. It normally operates on conditioned signals, that is, signals which have already been filtered and amplified by analog circuits. (2) Storage and communication components, application-specific input/output (I/O) components. In digital instrumentation system, the transmission of data between devices is realized relatively easily by using serial or parallel transmission techniques. (3) Ancillaries, such as displays and power supplies and application specific software.

Traditional hardware-centered instrumentation systems are made up of multiple stand-alone instruments that are interconnected to carry out a determined measurement or control an operation. They have fixed vendor-defined functionality and their components that comprise the instruments are also fixed and permanently associated with each other. All software and measurement circuitry packaged onto the traditional instrument are provided with a finite list of fixed-functionality using the instrument front panel.

Traditional hardware-centered instrumentation systems all tend to be box-shaped objects with a control panel and a display. Stand-alone electronic instruments are very powerful, expensive, very large and cumbersome. They also required a lot of power, and often have excessive amounts of features that are rarely used. Users generally cannot extend or customize them. The knobs and buttons on the instrument, the built-in circuitry, and the functions available to the user, are all typically specific to the nature of the instrument.

Virtual instruments represent a fundamental shift from traditional hardware-centered instrumentation systems to software-centered systems that exploit the computing power, productivity, display, and connectivity capabilities of popular desktop computers and workstations. Functionality of all these stand-alone instruments can be implemented in a digital environment by using computers, plug-in data-acquisition boards, and support software implementing the functions of the system. The plug-in data acquisition boards enable the interface of analog signals to the computer, and the software allows programming of the computer to look and function as an instrument. Virtual instrumentation is combination of hardware and the software which is completely customizable as per the need. The user-defined hardware components defined for the measurement are virtual instruments that replace the traditional instruments and are better so far as cost and compactness are factors of concern. It delivers instrumentation with the rapid adaptability required for today's concept, product and process design, development and delivery. With virtual instrumentation, the user-defined instruments required to keep up with the world's demand can be created. The major advantage of virtual instrumentation is its flexibility; changing function simply requires modification of supporting software. However, the same change in a traditional system may require adding or substituting a stand-alone instrument, which is more difficult and expensive. Virtual instruments also offer advantages in displaying and storing information. Computer display can show more colors and allow users to quick change the format of displaying the data that is received by instrument. Virtual displays can be programmed to resemble familiar instrument panel components, including buttons and dials. Computers also have more mass storage than stand-alone instruments do. Virtual instruments offer more flexibility in data handling.

Instrument interoperability and connectivity are the ability of devices to communicate and work with other instruments manufactured by different vendors in a manner that requires the user to have little or no knowledge of the unique characteristics of those instruments. Traditional Instruments including traditional hardware-centered instrumentations and software centered virtual instrumentations are specifically designed, constructed and refined to perform one or more specific tasks. When manufacturers develop these instruments, they naturally seek ways to differentiate their products from those of competitors. Most of the instruments on the market come with variety of connectivity technologies and do not have the built-in firmware and software to support the connectivity and interoperability of instruments. Different instruments provided by different vendors cannot be interoperated and interchanged. Even instruments within in the same class from different vendors are not compatible. In 1998, National Instruments, along with other companies including Agilent, Advantest, Anritsu, Ascor, BAE systems, Boeing, Ericsson, Genrad, Honeywell, IFR, Keithley, Lecroy, Nokia, Northrop Grumman, Racal, Ratheon, Rohde & Schwarz, Smiths, Tektronix, Teradyne, and Wavetek formed the interchangeable virtual machine foundation. Interchangeable Virtual Instruments (IVI) is a revolutionary standard for instrument driver software technology. It attempts to standardize the commands to which specific kinds of instruments respond and also makes it possible to interchange instruments in a test system without drastically revising the application software and maximize interchangeability across instrument brands. IVI plug & play drivers which were considered the industry-standard instrument drivers for many years have been largely replaced by IVI drivers. Unfortunately, the instrument driver did simplify software development and maintenance, it didn't address hardware obsolescence as each manufacturer had their own and none were compatible. Current applications are limited to large and expensive test and measurement instruments.

Instrument scalability provides further optimization of instrumentation design and operation. The first attempt to address the instrument scalability is the wireless sensor network.

A wireless sensor network (WSN) is a network formed by a large number of spatially dispersed and dedicated sensor nodes where each node is equipped with sensors for detecting or monitoring physical or environmental conditions and organizing the collected data at a central location. Every sensor node is equipped with sensor, a transducer, microcomputer, transceiver and power source. The transducer generates electrical signals based on sensed physical effects and condition. The microcomputer processes and stores the sensor output. The transceiver receives commands from a central computer and transmits data to that computer. The power for each sensor node is derived from a battery. Each sensor node is capable of only a limited amount of processing. But when coordinated with the information from a large number of other nodes, they have the ability to measure a given physical environment in great detail. Wireless sensor networks (WSN) which combine sensing, computation, and communication into a single tiny device are regarded as a revolutionary information gathering method to build the information and communication system and greatly improve the reliability and efficiency of infrastructure systems. Compared with the wired solution, WSNs feature easier deployment and better flexibility of devices. With the rapid technological development of sensors, WSNs will become the key technology for Internet of Things. Recent technological improvements have made the deployment of small, inexpensive, low-power, distributed devices, which are capable of local processing and wireless communication, a reality. In spite of the diverse applications, sensor networks pose a number of unique technical challenges. Power consumption is a central design consideration for wireless sensor networks whether they are powered using batteries or energy harvesters. Achieving a long lifetime of a sensor network requires low power hardware and algorithms. The current hardware cost of each individual sensor unit is still very high in order of $100 per unit.

Sensor networks provide a promising mechanism for data gathering and dissemination from the physical world, sensor data must be delivered within time constraints so that appropriate actions can be performed. Most of sensor network protocols either ignore real-time or simply attempt to process as fast as possible and hope that this speed is sufficient to meet requirements. It is important to develop real-time protocols for maintaining a desired delivery speed across the sensor network. Sensor networks may interact with sensitive data and operate in hostile unattended environments, it is critical that the information provided by the sensors be authenticated and the integrity verified. It is imperative that these security concerns be addressed from the beginning of the system design. The major obstacles to the implementation of wireless sensor network is wireless network programming. Wireless sensor networks are inherently more unreliable than traditional distributed systems. They are built to adapt to change dynamics and node and link errors such that the network continue to serve its intended purpose even when parts of network have failed. Traditional programming technologies rely on operating systems to provide abstraction for processing, I/O, networking, and user interaction hardware. When applying such a model to programming networked embedded systems, such as a sensor network, the application programmers need to explicitly deal with message passing, even synchronization, interrupt handling, sensor reading, unreliable communication channels, conflicts, latency, irregular arrival of messages, simultaneous events and the like. The complexity of designing and implementing this kind of application requires the professional programmers and non-conventional paradigms for protocol design. Wireless sensor network applications are still at early stages of development in the industry.

A universal instrument is a versatile device which combines many individual instrument functions, sensors and probes in a single unit. It has a primary purpose but also incorporate other instrument functionalities as well. One instrument could do many different measurements and controls and substitutes for many other instruments. It utilizes a variety of probes to connect to the device for a wide variety of process measurement and control. One of the popular examples of the universal instruments which have a similar concept but a few functions is the multi meter, which measures voltage, current, and resistance.

A universal instrument offers superior sensor or probe compatibility, versatility, interoperability, connectivity and scalability. Theoretically, it is feasible to design a universal instrument which is compatible with all sensors or probes on the market and capable of monitoring and controlling any combination of sensors or probes. Despite the undoubted usefulness of the universal instruments, one of the major obstacles that prevent the universal instruments from being adopted by end users is the cost. The cost of a $10 traditional instrument which incorporates the functions of a $1000 instrument may have to increase its cost to the order of $1000. The end user who just needs a $10 traditional instrument for his applications certainly does not have the motivation to spend $1000 for functions he does not need. Additional functionality always needs to be balanced against cost. The knobs and buttons on the instrument, the built-in circuitry, and the functions available to the user, all of these are specific to the nature of the instrument make them very expensive and hard to adapt in the universal instruments.

Smart phones have enabled a quantum leap in the use of mobile phones for daily life. A smart phone is a mobile phone with an advanced mobile operating system which combines features of a personal computer operating system with other features useful for mobile or hand held use. They typically combine the features of a cell phone with those of other popular mobile devices, such as personal digital assistant, camera, email, media player and GPS navigation unit. Most smart phones can access the Internet, have a touchscreen user interface, and instantaneously share information and events through the internet. Bluetooth, Wi-Fi, and GPS are becoming ubiquitous in smartphones. Smartphones and tablets have been considered recreational devices for communicating, playing games and streaming videos, but they are also one of the most powerful tools engineers use for designing, validating, and producing products. These ubiquitous smartphones perform much better than instrumentation in many fields. Because of their network connectivity, smartphones and tablets are great tools for remotely viewing measurements; their small size and processing power also make them effective for portable measurements. The ubiquity of wireless connectivity combined with increasing functionality and speed of connected devices and mobile networks will further drive consumer demand for more cost effective smartphone based instruments. The rapid adoption of smartphones continues, representing greater than 50 percent of mobile handsets in the U.S. currently with further penetration gains anticipated. According to Gartner Research, worldwide smartphone sales are expected to reach 1.5 billion units in 2016.

In view of the foregoing, there is a need for a universal smart device that has the potential to be compatible with any sensor or any number of sensors, where the smart device can be converted into any device as long as the corresponding sensor is used.

SUMMARY OF THE INVENTION

Building an application for a smartphone or tablet and turning a smartphone or tablet to an instrument are not trivial tasks. Many of the instrument manufacturers have limited or no expertise programming for mobile platforms and designing wireless hardware. Embodiments of the present invention help instrument manufacturers take advantage of these smart devices.

In today's consumer driven world, product development and innovation are moving at a lightning pace. Instrument technology progresses in waves with each new wave replacing or extending the previous generation of instruments. To stay competitive, instrument manufacturers need to be able to keep up with the pace. They share many of the same frustrations and confront common challenges, offshore competition, finding and retaining skilled labor, quality assurance, component qualities, inventory, rising costs and Government regulations. Because of the highly-specialized skills and experience required in this industry, instrument manufacturers are experiencing skills and performance gaps as a consequence of advanced technologies and significant challenges in recruiting highly skilled hardware design professionals. Finding and retaining a well-stocked talent pool of specialized engineers is a constant burden for the companies.

Embodiments of the present invention promote, develop and commercialize the universal smart technologies needed for closing gaps in the innovation chain and eliminating the frustration associated in instrument design and manufacturing.

Embodiments of the present invention provide a universal smart instrumentation system comprising a computing device; a universal smart device comprising a sensor module and a wired or wireless module for sending and receiving data to and from the computing device; a probe or sensor communicating with the sensor module, wherein the probe or sensor includes built-in sensor specifications; and a software application stored on non-transient media on the computing device having programming code for detecting the specifications of the sensor or probe and configuring the computing device to receive and display the measurement or data therefrom.

Embodiments of the present invention further provide a universal smart instrumentation system comprising a mobile computing device; a universal smart device comprising one or more sensor modules, a wired or wireless module for sending and receiving data to and from a computing device, and a microcontroller unit controlling the universal smart device; one or more probes in communication with the one or more sensor modules, each of the one or more probes having built-in probe specifications; and a software application running on the mobile computing device, the software application receiving data from the wired or wireless module of the universal smart device, the data including the built-in probe specifications for each of the one or more probes, recognizing each of the one or more probes connected thereto, and providing a display on the mobile computing device for recording data from each of the one or more probes.

Embodiments of the present invention also provide a method for making measurements comprising making a measurement with one or more probes, each of the one or more probes communicating with one or more sensor modules; coupling the one or more sensor modules with a universal smart device, the universal smart device having a wired or wireless module for sending and receiving data and a microcontroller unit controlling the universal smart device; sending, via the wired or wireless module, first data from the one or more probes to a computing device running a software application; recognizing a type of probe of each of the one or more probes by the software application from the first data received from the probe; establishing a user interface on the computing device for the type of probe; sending, via the wired or wireless module, second data from the one or more probes to the computing device, the second data including measurement data; and displaying measurement data on the user interface.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
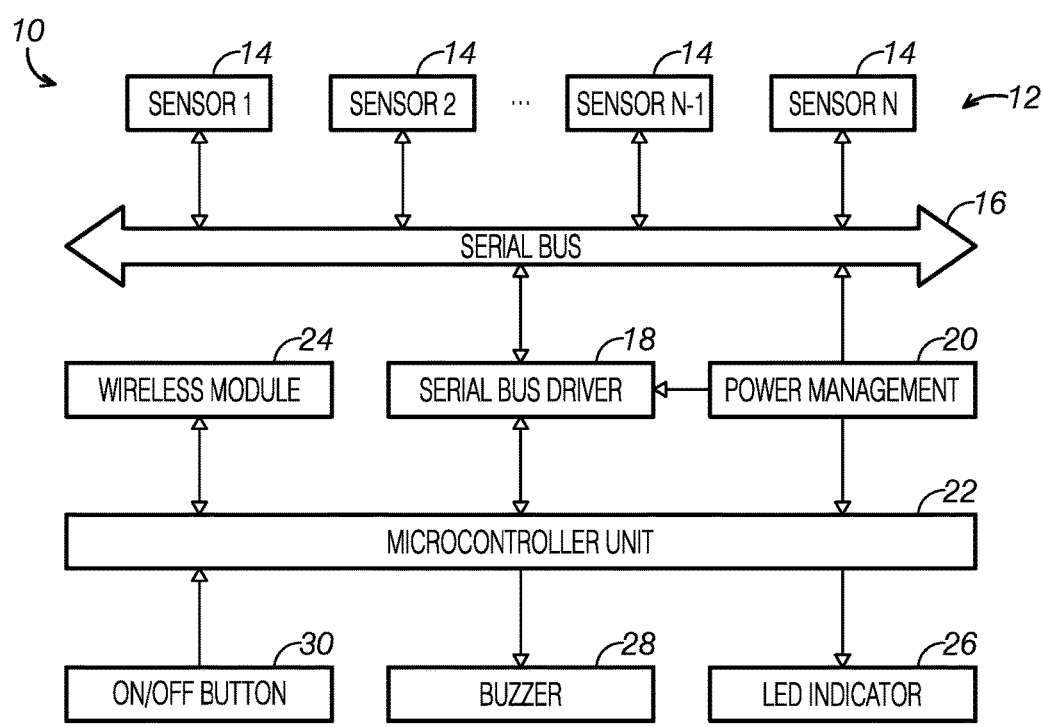
FIG. 1 illustrates a schematic diagram showing various components of a universal smart device according to an exemplary embodiment of the present invention.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" or "computing device" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, handheld devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Python, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code may also be distributed among a plurality of computational units wherein each unit processes a portion of the total computation.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASHEEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Using an already purchased computing device, such as a smart phone, mobile computing device, or computer, to replace hardware of the instruments overcomes the cost issue in designing the universal smart instruments and holds the potential to revolutionize the instrument industry. Powerful computational capability, standard touch screen interface, ubiquitous wireless connectivity, almost unlimited functions or applications available to the users offer the potential for the engineers to design universal instruments which have the full interoperability and absolute instrument interchangeability. The computing device can be used for display, control and monitoring, graphical user touch screen interface, data processing and analysis capabilities, video and audio, camera, GPS, ubiquitous wireless connectivity, internet-based communication and almost unlimited functions or applications available to the user.

Distinguished from traditional instruments, a universal smart instrument takes the maximum advantages of the latest smart phone or mobile computing devices which support powerful computational capability, standard touch screen interface, ubiquitous wireless connectivity, audio, video, GPS, text, email and almost unlimited functions or applications available to the users do not contain in the traditional instrument. The instrument control panel is realized on the smartphone by applying the interactive graphical representation of control and indicator elements common in real instruments such as knobs, buttons, dials, graphs and the like. A soft control touch screen interface, which supports real-time data monitoring, facilitates instrument control and operation. Most traditional instruments do not have sufficiently powerful computational capability to deal with the demanding applications in modern industrial measurement systems. On the contrary, in a universal smart instrument, a smartphone or mobile computing device is an integral part of the instrument system, so its strong computational and control capabilities can be applied to deal with various industrial measurements.

Universal smart instruments unify heterogeneous measurement probes on the market into a single device that can be readily modified or expanded when new technologies need to be added to the existing system or current measurement requirement change. Universal smart instruments also make use of the internet to publish and share data, which was unable to be achieved in conventional propriety instruments. The promise of universal smart instrument is closely as associated with the development and proliferation of mobile smart technologies which provide the major technical support to the universal smart instrument such as attractive graphical user touch screen interface, data processing and analysis capabilities, video and audio, cameras, GPS, ubiquitous wireless connectivity and internet based communications. These features embody the advantages of universal smart instrument which are lacked in the stand-alone instrument system. As compared with the traditional instrument, the universal smart instrument has the following major characteristic.

Using an already purchased smart phone replaces the traditional instrument hardware and a considerable amount of development time and hardware cost is saved. The hardware and software in the universal smart instrument offer outstanding features such as an open structure, modularity, reusability and interoperability. The user and instrument manufacturers can easily add or change an instrument module for the special industrial application without needing to purchase a new industrial measurement system and redesign their instrument from the scratch. Thus, the expandability of an industrial measurement system is significantly increased.

Universal smart instruments also automatically identify the probes and configure the device for the user. Plug-and-play represents a vast improvement over traditional instruments, as it removes the burden of device integration from the user, allowing instruments and probes to interoperate freely. By utilizing universal smart technology, the traditional instrument design is simplified to the minimal—only the data acquisition module is needed. The knobs, buttons, dials used in the traditional instruments are eliminated and replaced by the graphical user touch screen interface.

Universal smart protocol focuses not only on the design of hardware and software modules, but also on the design of the overall universal smart instrument system guided by the structured, universal and modular principles. It is open to both instrument manufacturers, software and hardware developers. Knowing that most of the traditional instrument manufacturers are proficient in embedded programming, but have limited or no expertise programming for mobile platforms, the artificial intelligence built in universal smart technology protocol completely eliminates the programming of the smartphone applications.

The traditional instrument engineers just utilize their embedded programming expertise and code their instrument specifications into the data acquisition module. The universal smart application software will automatically identify and configure the attractive graphical user interface for the end users based on the instrument connected and desired to be used. The application software may be designed using an open architecture of incorporating a variety of many individual instrument functions, sensors and probes from different industries to the greatest extend possible into the same single unit.

In some embodiments, the universal smart application software can utilize a universal smart protocol for receiving data from the universal smart device. The same universal smart protocol may be used in the sensor modules, which connect the probes or sensors to the universal smart device. The universal smart protocols can be open sources to the designer and are formal descriptions of digital message formats and rules. The universal smart protocols are used to exchange messages in or between the computing device and sensors or probes. The universal smart protocols can include authentication, error detection and correction and signaling, for example.

Embodiments of the present invention offer flexibility. Changing or adding function simply requires modification of the application software. However, the same change in a traditional system may require to adding or substituting a stand-alone instrument, redesigning the overall circuit, including the casing, which is more difficult and expensive, time consuming and delay the time to market. Universal smart instruments offer more flexibility in data sharing and handling which is difficult to achieve in the traditional propriety instruments.

Embodiments of the present invention offer compatibility. The compatibility in universal smart instrument system refers not only to the compatibility between the same types of instruments from different manufactures, but also to the compatibility between various instrument types. The full interoperability and absolute instrument interchangeability is addressed in the protocol used in the application software.

Embodiments of the present invention offer universality. One of the major focuses of universal smart instrument system is the integration of all functionalities of the traditional instruments into a single unit, which provides the foundation for different data acquisition modules executing on the same mobile platform. Thus, the interoperability between various sensors or probes can be achieved.

Embodiments of the present invention offer upgradeability. Most traditional instrument interface is a unidirectional application, the instrument performs its task and transmits results to the interface device in one direction only. Many traditional instruments have been limited by design to unidirectional interfaces. They only perform monitoring tasks and share majority of functions of the bi-directional controlling instruments, however, they cannot be upgraded by controllers. Conventionally, end users have to purchase a new controlling instrument for their applications. Taking advantage of the secure bi-directional wireless communications and interface supported by the smartphone or mobile devices, universal smart instruments which deliver data between the smartphone and sensors back and forth can be readily modified or upgraded by adding the corresponding actuators for controlling applications. Sensors or probes measure the output performance of the device being controlled and give feedback to the sensor modules that can make corrections toward desired performance.

Embodiments of the present invention offer expandability and scalability. Similar to sensor network technology, universal smart instrument is much more flexible than a sensor network. The universal smart instrument can monitor and control currently a few hundred sensors or probes, it automatically identifies and configures the corresponding graphical user interfaces. End users are free to add or removes sensors or probes. All communication protocols supported by the smartphone are integrated in the software design including Wi-Fi, Bluetooth®, cellular network technology and wired form through the audio port on the smartphone, for example.

Embodiments of the present invention offer security. Universal smart instruments have a sensor security built-in data acquisition module and helps companies meet sensor security requirements and prevents unauthorized users from accessing the sensor measurement and control. Unauthorized access of the universal smart instrument sensors is forbidden.

Embodiments of the present invention offer modularity. Increasing instrument complexity is driving the instruments to become more modular. The knobs and buttons on the instrument, the built-in circuitry, and the functions available to the user used in the traditional stand-alone instruments duplicate these components for each instrument, adding cost and size. Universal smart instruments divide all instruments into three parts: smartphone including its application software, wireless communication module (also referred to as the universal smart device) which is not needed in the wired form, and task-specific data acquisition modules. The smartphone is used and purchased and no research and development is needed. The high degree of modularity saves a lot of time in development, maintenance, and support. Modular hardware and software limits the time needed to test products so developers can spend more of their energy on something more innovative.

Embodiments of the present invention offer fast prototyping. The market never waits. Reducing time-to-market is a key requirement for business success and can be a competitive advantage for those that do it right. Using a smartphone, or other similar computing device, as a platform with universal smart technology is a cost effective and fully production-ready wireless hardware and software that has a huge market advantage in shorting design, build, test and fix cycles. A large fraction of the traditional instruments has been replaced by the smartphone, universal smart instruments and mobile application software. The instrument design process was greatly simplified which offers a fast prototyping in the future research and development.

Embodiments of the present invention provide a reduction in inventory. A vast majority of the instrument modules in the traditional instruments can be replaced by the smartphone, or other like computing device, and universal smart instruments. The traditional instrument inventory can be reduced which leads to the reduction in working capital requirement and increases the amount of cash available to run the company.

Universal smart instruments share many similarities in terms of functionalities and advantages over traditional instruments with virtual instruments. They are also soft-centered technologies. However, developing the software of a virtual instrumentation is not trivial, a programming language or special software can be used. Professional software engineers with virtual instrument expertise are needed. A virtual instrument consists of an industry-standard computer or workstation equipped with powerful application software, cost-effective hardware such as plug-in boards, and driver software, which together perform the functions of traditional instruments. Its primary focus is on large, expensive testing and measurement instruments, not the portable devices. The unique natures of the smartphone operating systems, such as IOS or Android, are significantly different from those used in industry-standard computers or workstations. The migration of virtual instrument technology from industry-standard computers or workstations to the mobile devices, such as the smartphone, is not straight forward. Virtual Instrument Software Architecture, commonly known as VISA, is a comprehensive package for configuring, programming, and troubleshooting instrumentation systems comprised of GPIB, Serial, VXI, PXI, Ethernet, and USB interfaces which are wired forms of communications and widely used in the traditional instruments. Universal smart instruments adopt ubiquitous wireless connectivity for communications between a sensor and the smartphone. The wired form communications used in virtual instruments cannot be applied to wireless communications supported by the smartphone. Industry-standard computers or workstations have much more powerful computational capability, memories and storage to deal with the demanding applications in modern industrial measurement systems than those of smartphones. The software architecture designed in universal smart instruments is significantly different from that of virtual instruments. There are many applications which can be running currently on the smartphones. Universal smart instrument software should not interference with this other software. Mobile application programming and wireless communication technologies are the major bottleneck for instrument engineers who do not have the mobile application programming and wireless communication expertise.

Embodiments of the present invention provide a comprehensive package including both universal instrument application software for smartphones, or other similar mobile devices, and hardware for wired or wireless communications between smartphone and sensors called the universal smart device. These technologies, including instrument protocol, completely eliminate the above referenced bottlenecks. No smartphone programming and wireless communication knowledge are required, instrument engineers just use their traditional embedded programming and spend a small fraction of their time and code the instrument specification into the data acquisition modules, including sensors or probes, according to the universal smart protocol, and then enjoy the huge hardware cost reduction and more functionalities provided or supported by the smartphone. The instrument design is simplified to the data acquisition design and any other functions are achieved by the universal smart instrument software. Universal smart technology offers the potential to standardization of the instrument design.

There are a few applications which have been commercialized using a smartphone as its platform. They are in the early stage of commercialization. The application software and hardware are designed for their specific applications. Universal smart technologies are designed in such a way that only single software package and hardware support all instrumentation applications, no new software and hardware is needed, which helps traditional instrument manufacturers migrating from their traditional instruments to the state of the art universal wired or wireless smart instruments seamlessly.

The universal smart instrument not only has primary functionalities, but also features an open architecture of incorporating variety of many individual instrument functions, sensors and probes from different industries to the greatest extent possible into the same single unit. The users and instrument manufacturers are free to add, remove or change a sensor module for the special industrial application without needing to create their own smart app and redesign their own hardware. A sensor change is all the universal smart instrument requires to switch from one kind of a device to another.

Figure 2:
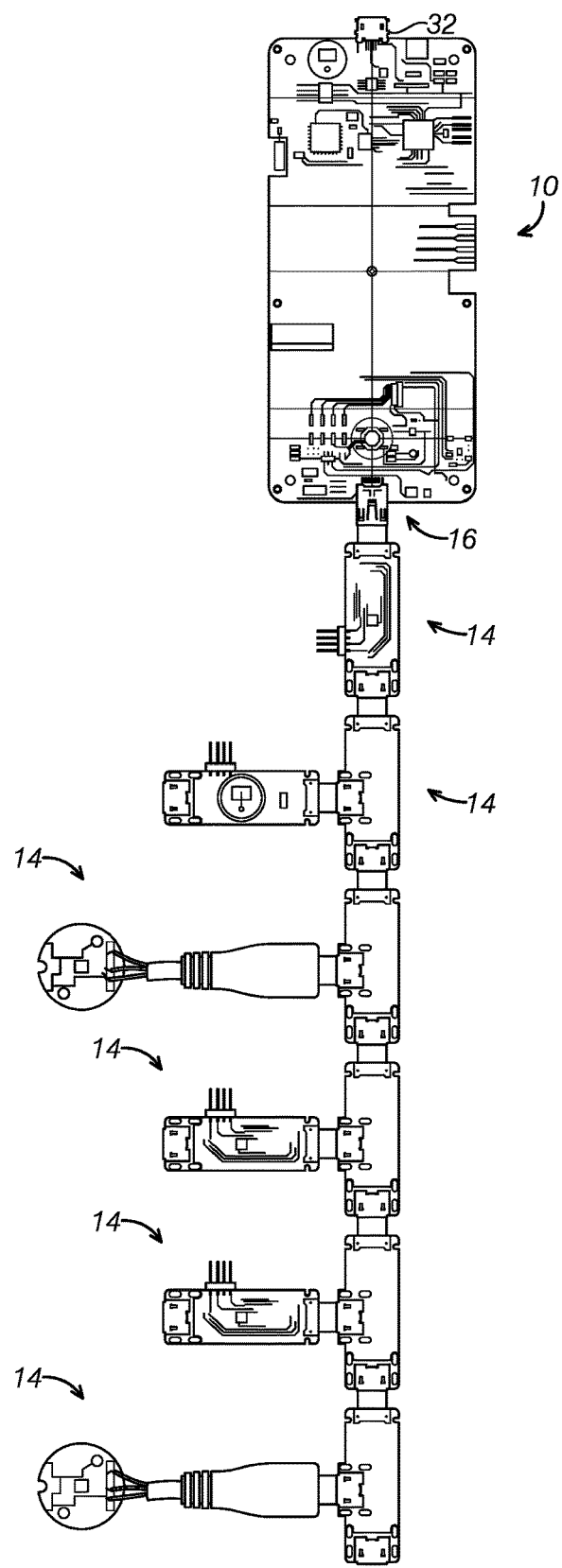
FIG. 2 illustrates the universal smart device of FIG. 1 connected with a plurality of sensor modules, according to an exemplary embodiment of the present invention.
Figure 3:
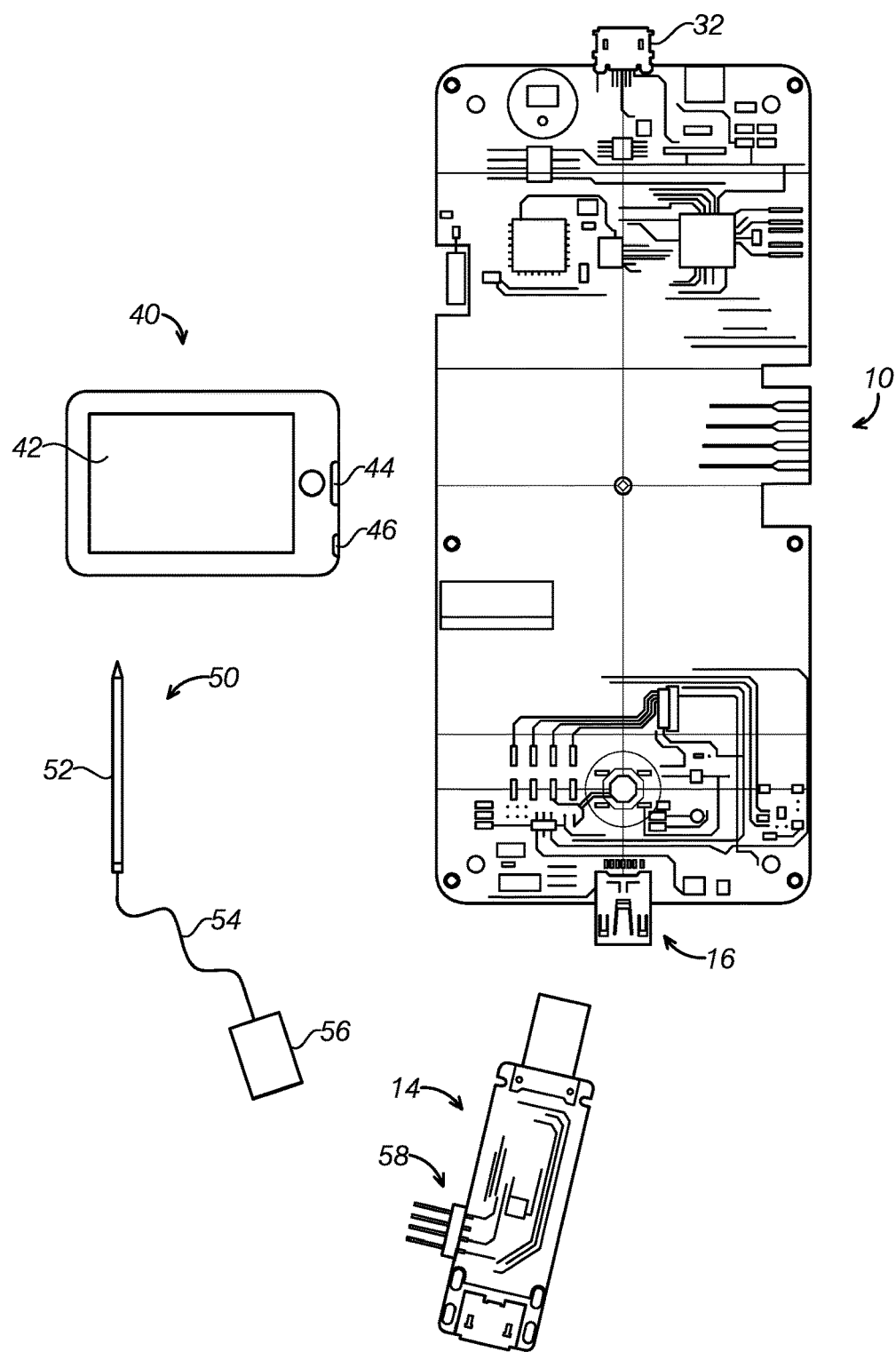
FIG. 3 illustrates the universal smart device of FIG. 1, with a disconnected sensor module, and a smartphone operable to receive signals from the universal smart device, according to an exemplary embodiment of the present invention.

Referring now to FIGS. 1 through 3, a universal smart instrument system can include a universal smart device 10 that may connect via a port 16, such as a serial bus, to one or more sensor modules 14. Probes 50, also referred to as sensors 50, can connect to the sensor modules 14 to effectively communicate with the universal smart device 10. While physical connections are shown between the probes 50 and the sensor modules 14, and between the sensor modules 14 and the universal smart device 10, these connections may be wired or wireless connections. While a serial bus/serial connection is shown and described, any connection/communication protocol may be used, including wireless, serial or parallel port, universal serial bus (USB), power line communications, RS-485, and the like.

Referring specifically to FIG. 1, the universal smart device 10 can include various components. For example, the universal smart device 10 may include the serial port 16 (or any other type of port, wired or wireless, as discussed above), via its serial bus, for connecting one or more sensor modules 14. A serial bus driver 18 may recognize when a sensor module 14 is connected to the serial port 16 and assign such sensor module 14 a specific address. In some embodiments, up to 256 addresses may be assigned, effectively allowing the universal smart device 10 to drive up to 256 sensor modules 14. Of course, intermediate stations or universal smart devices 10 may be used to allow for an increased number of sensor modules 14.

A power management module 20 may receive input power for the universal smart device 10 and distribute the power as needed. The input power may be from one or more batteries, or may be via a wired connection to a power supply (not shown). A power supply jack socket 32 is shown in FIG. 2.

A microcontroller unit 22 may be programmed to receive data from the serial port 16 and transfer that data to a computing device, such as a smartphone 40 (see FIG. 3) via a wireless module 24, for example. As discussed above, the wireless module 24 may communicate with the smartphone 40 via various communication protocols as may be recognized in the art.

The universal smart device 10 may optionally include other user indicator and controls, such as an on/off button 30, one or more illuminated indicators 26 and one or more sound generating devices 28. The indicators 26 and the sound generating devices 28 may provide feedback to the user to indicate, for example, availability of a newly attached sensor module 14, wireless connection of the universal smart device 10 to the smartphone 40, battery strength, sensor error, or the like.

The sensor modules 14 may include a connector 58 for down loading a software into the sensor module 14. The connector 58 is optional and may be removed from the sensor modules 14 once the design stage is completed. The probe 50 may include more sensors, for example, a probe sensor 52 for making a measurement. In some embodiments, the probe sensor 52 may be connected by a wire 54 to a data acquisition board 56 for electrical connection to the sensor module 14. In other embodiments, a wireless module (not shown) may attach to the sensor module 14 (or may be built into the sensor module 14 and/or probe 50) to permit wireless communication.

While the probe 50 is shown in a particular configuration, the present invention is not limited by the example shown in FIG. 3. The probe 50 may be any device capable of measuring a property, such as physical, electrical, mechanical, atmospheric, sound, and the like, properties.

The smartphone 40 can include a display 42 and one or more input ports 44, 46. The display 42 of the smartphone 40 may mimic a control panel of conventional instrumentation, including a display, virtual knobs, and the like, as described above in greater detail.

The smartphone 40 may include a processor (not shown), as is known in the art. The smartphone 40 may further include a universal smart device software application, or simply referred to an application or app. The software application can include the features discussed above. Specifically, the software application may receive the wired or wireless signal from the universal smart device 10, which would include data from one or more of the probes 50 or the sensor modules 14. The software application can include program code to recognize the specific sensors in sensor modules 14 and/or probes 50 attached to the universal smart device 10 and, if selected by the user, provide a display appropriate for that particular probe 50. The specifications of each probe 50 may be saved in the probe itself, where, upon plugging in the probe, the software recognizes the probe 50 and calls the proper interface for the user. The software application may display parameters from one or more probes at a time. The software application, as discussed above, may be capable of sending the data from one or more probes to another computing device, for example, via a wireless or wired signal.

The software application can receive data from the one or more probes generally in real time. In some embodiments, the data from the probes may be updated at speeds up to about 30 Hz.

The software application may include various additional features, such as voice command recognition, customizable user interfaces, and the like. The user may provide customized names for the probes, allowing intuitive interaction with the software application.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a sub combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A method comprising:
receiving, at a computing device, a first sensor specification data or code and a first sensor measurement data from a first sensor module;
generating a first user interface based on the first sensor specification data;
displaying the first sensor measurement data in the first user interface;
receiving, at the computing device, a second sensor specification data or code and a second sensor measurement data from a second, different sensor module;
generating a second user interface based on the second sensor specification data or code; and
displaying, at the computing device, the second sensor measurement data in the second user interface, wherein the first sensor specification data or code, the first sensor measurement data, the second sensor specification data or code, and the second sensor measurement data are received through a serial bus that is connected to the first sensor module and the second sensor module.

2. The method of claim 1, wherein the first user interface is generated by a software application stored at the computing device based on the first sensor specification data or code.

3. The method of claim 1, wherein the computing device is a smart phone.

4. The method of claim 1, wherein the first sensor module is connected to a first sensor probe that produces the first sensor measurement data and the second sensor module is connected to a second, different sensor probe that produces the second sensor measurement data.

5. The method of claim 1, wherein the first sensor specification data or code from the first sensor module comprises instructions written in a first language and the second specification data or code from the second sensor module comprises instructions written in a second, different language.

6. A method comprising:
receiving a first sensor measurement data from a first sensor;
storing a first sensor specification data or code associated with the first sensor; and
forwarding the first sensor measurement data and the first sensor specification data or code to a computing device, wherein the computing device stores a software application that (i) uses the first sensor specification data or code to generate a first graphical user interface and (ii) displays the first sensor measurement data in the first graphical user interface, wherein the first sensor measurement data and the first sensor specification data or code are forwarded to the computing device through a universal smart device that receives sensor specification data or code and sensor measurement data from a plurality of different sensors, wherein the universal smart device receives the sensor specification data or code and the sensor measurement data from the plurality of different sensors through a plurality of sensor modules that are connected to a serial bus.

7. The method of claim 6, wherein the computing device is a smart phone.

8. A method comprising:
providing a software application that is executable by one or more processors of a computing device to perform a plurality of actions, the plurality of actions comprising:
receiving a first sensor specification data or code and a first sensor measurement data from a first sensor module;
generating a first user interface based on the first sensor specification data or code; displaying the first sensor measurement data in the first user interface;
receiving a second sensor specification data or code and a second sensor measurement data from a second, different sensor module;
generating a second user interface based on the second sensor specification data or code, wherein the first sensor specification data or code from the first sensor module comprises instructions written in a first language and the second sensor specification data or code from the second sensor module comprises instructions written in a second, different language; and
displaying the second sensor measurement data in the second user interface.

9. The method of claim 8, wherein the first sensor specification data or code, the first sensor measurement data, the second sensor specification data or code, and the second sensor measurement data are received through a serial bus that is connected to the first sensor module and the second sensor module.

10. The method of claim 8, wherein the first user interface is generated by a software application stored at the computing device based on the first sensor specification data or code.

11. The method of claim 8, wherein the computing device is a smart phone.

12. The method of claim 8, wherein the first sensor module is connected to a first sensor probe that produces the first sensor measurement data and the second sensor module is connected to a second, different sensor probe that produces the second sensor measurement data.

* * * * *